United States Patent [19]

Kinder et al.

[11] Patent Number: 4,680,153
[45] Date of Patent: Jul. 14, 1987

[54] PROCESS FOR MANUFACTURING HIGHLY POROUS MINERALIC BODIES OF POLYMORPHIC STRUCTURE

[75] Inventors: Reiner Kinder, Leipzig; Johannes Teubel, Freiberg; Herbert Schuster; Christine Fanslau, both of Leipzig, all of German Democratic Rep.

[73] Assignee: Institut for Energetik - Zentralstelle fur Rationelle Energieanwendung, Leipzip, German Democratic Rep.

[21] Appl. No.: 614,920

[22] Filed: May 29, 1984

[30] Foreign Application Priority Data

May 27, 1983 [DD] German Democratic Rep. ... 251337

[51] Int. Cl.$^4$ ............................................... B28B 1/50
[52] U.S. Cl. ..................................... 264/44; 264/29.6; 264/63; 264/85; 264/DIG. 49
[58] Field of Search .................. 264/63, 29.5, 44, 85, 264/DIG. 49, 29.6

[56] References Cited

U.S. PATENT DOCUMENTS

| | | | |
|---|---|---|---|
| 2,360,929 | 10/1944 | Blaha | 264/44 |
| 2,691,598 | 10/1954 | Meurice et al. | 264/DIG. 49 |
| 2,976,598 | 3/1961 | Creutz | 264/85 X |
| 3,176,054 | 3/1965 | Einstein et al. | 264/44 |
| 3,917,773 | 11/1975 | Gates, Jr. et al. | 264/44 |
| 4,002,587 | 1/1977 | Watanabe et al. | 284/29.5 |
| 4,166,145 | 8/1979 | Hatch et al. | 264/29.5 |
| 4,191,720 | 3/1980 | Pasco et al. | 264/44 X |
| 4,424,179 | 1/1984 | Minjolle et al. | 264/44 |
| 4,439,382 | 3/1984 | Joo et al. | 264/29.5 |

FOREIGN PATENT DOCUMENTS 1058615  2/1967  United Kingdom ....... 264/DIG. 49

OTHER PUBLICATIONS

Norton, F. H. *Elements of Ceramics*, Cambridge, Mass., Addison-Wesley Press, 1952, p. 95.
*Dictionary of Ceramics*, by A. E. Dodd, New York, Philosophical Library, ©1964, pp. 122; 208, 209, 303, 304.
*Whittington's Dictionary of Plastics*, by Lloyd R. Whittington, Stamford, Conn., Technomic, ©1968, Preface, pp. 179, 180, 181.
*Hackh's Chemical Dictionary*, Fourth Edition, completely revised and edited by Julius Grant, New York, McGraw-Hill, ©1972, pp. 281, 287, 527, 716, 717.
*Dictionary of Ceramic Science and Engineering*, by Loran S. O'Bannon, New York, Plenum Press, ©1984, pp. 114, 192, 193, 270.

*Primary Examiner*—Philip Anderson
*Attorney, Agent, or Firm*—Karl F. Ross; Herbert Dubno

[57] ABSTRACT

In order to produce mineralic bodies of high porosity, usable inter alia as adsorbers, purifiers and catalyst carriers, a predominantly mineralic mass with organic admixtures—both preferably obtained from industrial waste products—are subjected to a three-phase treatment. In a first phase, the mass is heated in an inert or reducing atmosphere to a sintering temperature between about 1000° C. and 1350° C. whereby the organic constituents are carbonized and partly penetrate the consolidating mineralic structure. In a second phase, still under the same nonoxidizing atmosphere and at the sintering temperature referred to, the mineralic structure is sintered into a coherent matrix. In a third phase, with reduction of the temperature to a lower level between about 600° and 1000° C. and exposure to the atmosphere, the carbonaceous substances occluded in the mineralic skeleton are burned off to increase its porosity.

12 Claims, 6 Drawing Figures

(FLOW DIAGRAM— VARIANT 1)

(FLOW DIAGRAM— VARIANT 1)

(FLOW DIAGRAM - VARIANT 2)

PROCESS FOR MANUFACTURING HIGHLY POROUS MINERALIC BODIES OF POLYMORPHIC STRUCTURE

FIELD OF THE INVENTION

Our present invention relates to a process for manufacturing highly porous mineralic bodies with heterogeneous pore structure, usable inter alia as adsorbers, purifiers, catalysts or catalyst carriers as well as drying and separating agents. They are mainly utilized in waste-gas and waste-water purification as well as in chemical synthesis processes.

BACKGROUND OF THE INVENTION

The most important porous mineralic bodies are silica gel, activated alumina and molecular-sieve zeolites, used preferentially as adsorbents. In comparison with carbon-containing adsorbents, they are characterized by a high oxidation resistance and highly hydrophilic properties. Silica gel is a solid precipitated from colloidal systems, consisting essentially of amorphous silicic acid and water. Upon its dehydration, secondary structures of coherent polysilicic acids are permeated by a system of pores of different sizes and cross-sections whose width depends on the pH of the starting solutions. The dehydrated silica gels constitute materials of significant adsorptivity for water and other polar substances.

Activated alumina is a porous form of aluminum oxide obtained from precipitated alumina hydrates by calcination in a temperature range between 200° and 800° C. Different types of alumina can be distinguished according to their properties regarding grain structure, adsorptivity, purity and mechanical strength. An increase of their effective surface is achieved by the addition of certain interacting cations such as those of calcium.

In the case of molecular-sieve zeolites one can distinguish between natural and synthetic zeolites which can be regarded as differently hydrated aluminum silicates. The most significant property of the aluminum silicates is the fact that their stepwise dehydration occurs without a change in their crystal structure. The resulting regular lattice configuration with pores open to the internal cavities of the crystal lattice constitutes the pore volume which is essential for adsorption. Three basic methods are available for the manufacture of industrial zeolites, namely a purification of natural zeolites, a recrystallization of natural minerals and a direct synthesis from the components of zeolites, namely the processing of aluminates, silicates, alkalies and alkaline earths in an aqueous medium.

Direct synthesis most often relies upon recrystallization which is also used for the manufacture of porous aluminum oxides. This technique consists in first obtaining amorphous precipitates from the aforementioned components which can be partly or completely converted into crystalized products by an after-treatment such as a hydrothermal process or controlled sintering. The various types of zeolites are obtainable by modifying the concentration of the starting materials and by a choice of after-treatment. Further alternatives in the production of molecular sieves include the replacement of the pure starting materials by cheaper substances or waste products, such as clay, kaolin, and fly ash from filter stages of power plants. The utilization of such low-cost materials has been described, for example, in G.D.R. (East German) patents WP No. 156,592, relating to adsorbents for utilization in thermal panes and glazing units, and WP No. 156,254, pertaining to a process for the production of an aluminum-silicate adsorbent.

Other porous mineralic bodies, of lesser significance, are porous glasses and porous thorium oxide. Porous glasses are produced from a specially constituted boron/silicate glass by annealing and subsequent treatment with 3-normal hydrochloric acid. Porous thorium oxide is manufactured by the well-known sol/gel process. In the production of special cores of thorium oxide for high-temperature reactors, soot or graphite is dispersed in the gel and is removed with the aid of atmospheric oxygen after a sintering process.

A drawback of the conventional porous mineralic bodies is their low mechanical and thermal stability. Their use as drying agents, catalyst support or adsorbents in various technical processes generally involves an exposure to more or less elevated temperatures. Particular problems exist when a thermal regeneration or reactivation of the material is essential for reasons of economy an efficiency.

In the case of activated alumina and silica gel, a risk of impairment exists already at temperatures somewhat above 300° C. If, for example, activated alumnia is subjected to temperatures above 400° C., its active surface shrinks. A temperature of 600° C. reduces the specific surface of alumina from 300 to 200 $m^2/g$. Molecular-sieve zeolites, which have the highest thermal stability among the substances referred to above, are stable up to a temperature of 600° C. or, with a few types, 800° C. A disadvantage of these molecular sieves, however, is that their uniform pore system makes them unstable for wastewater purification, as does their high affinity for water due to their hydrophilic properties.

An adsorbent described in the aforementioned G.D.R. patent WP No. 156,254 is a modified molecular sieve which is produced by a hydrothermal treatment of power-plant filter ash and thus has the same drawbacks as normal molecular sieves. The other G.D.R. patent referred to, WP No. 156,592, describes the utilization of such a material for the recovery of water vapor from inflation gases.

Porous glasses and thorium oxide cannot be widely used for adsorption and purification purposes, on account of their high material and production costs. Also disadvantageous is the extreme thermal sensitivity of thorium oxide manufactured by the sol/gel process.

OBJECTS OF THE INVENTION

The general object of our present invention is to provide a process for making highly porous mineralic bodies or heterogeneous pore structure which obviate the disadvantages discussed above.

A more particular object is to provide a process of this character which utilizes inexpensive starting materials of predominantly mineralic nature, especially industrial waste products such as flocculation sludges from waste-water-purification plants, filter ash from lignite-burning power plants, or residues from the carbochemical processing of lignite.

Still more specifically, our invention aims at producing a highly porous mineralic body with a thermal stability up to at least 1000° C., a porosity of at least 50% and a specific surface on the order of ten times that of the starting materials while being repeatedly thermally regenerable or reactivable.

SUMMARY OF THE INVENTION

We realize these objects, in accordance with our present invention, by producing in as a first step a mixture consisting predominantly of mineralic matter, with organic admixtures and especially with reactive organic admixtures. In a second step, the mixture is heated in a nonoxidizing (reducing or inert) atmosphere to a sintering temperature of the mineralic matter, generally ranging between about 1000° and 1350° C. This step may last for substantially 30 to 180 minutes, preferably about 60 minutes. In a third step the mixture is maintained at that sintering temperature, still in the nonoxidizing atmosphere, for a period long enough to enable consolidation of its mineralic matter into a coherent structure interpenetrated by carbonized organic matter; this period may last for substantially 15 to 120 minutes, preferably about 30 minutes. In a fourth step, the pyrolitically treated mass is exposed to an oxidizing atmosphere (e.g. ambient air) at a reduced temperature, preferably about 800° C., high enough to burn off the carbonized matter with a resulting increase in the porosity of the coherent structure. This final step may last for substantially 30 to 240 minutes, preferably about 120 minutes. Thus, the average time for the three-phase (heating up, sintering, oxidation) treatment is about 3½ hours.

BRIEF DESCRIPTION OF THE DRAWING

The above and other objects, features and advantages of our present invention will become more readily apparent from the following description, reference being made to the accompanying highly diagrammatic drawing, in which.

SPECIFIC DESCRIPTION

The present process involves a number of partly overlapping occurrences, namely redox reactions coupled with dissociation and dehydration phenomena, morphological transformations from amorphous to crystalline structures and, following the carbonization of the organic matter, a gasification of the resulting carbon.

Porous mineralic bodies produced by our process are useful in the manufacture of hydrophobic adsorbents as disclosed in our concurrently filed application Ser. No. 614,919.

Advantageously, the quality of the resulting mineralic body can be improved by further admixtures, including additional organic matter supplementing that which originally accompanies the mineralic starting materials. These further admixtures can be classified into nonreactive materials, which are inert with reference to the organic matter, and reactive materials able to interact with the mineralic substances during the pyrolitic treatment. Examples of nonreactive materials are oleaginous residues, tars from carbochemical and petrochemical processes, and graphite-like substances. As reactive admixtures we may name fatty acids, saccharose, saccharose residues as well as residues from cellulose decomposition such as waste sulfite liquor. Substances of either or both types may be admixed with the original mass if the latter does not initially contain sufficient organic matter.

The total amount of organic admixtures, in terms of its carbon content, ought not to exceed about 15% by weight of the mineralic matter, with a maximum of about 5% for reactive substances and about 10% for nonreactive substances. The interaction of the former substances with the mineralic matter results in a heteropolar bonding with a consequent significant increase in pore formation. Typical reactions are the conversion of sodium stearate with the calcium or the magnesium of the ashes to insoluble calcium or magnesium stearates or the conversion of saccharose to calcium saccharose.

If both reactive and nonreactive admixtures are employed, we prefer to introduce first the former and let the interaction proceed, with subsequent drying of the reaction products. Surprisingly, we have found that this reduces the hydrophilic properties of the mineralic matter and thus considerably promotes the subsequent blending thereof with the nonreactive or relatively inert admixtures.

We also have found that certain inorganic salts, especially chlorides, sulfates and carbonates of alkaline earths, are usefully added before the first heating step in order to decompose at the elevated temperatures with formation of gases enhancing the porosity of the resulting structure.

Advantageously, the composite mass of mineralic and inorganic matter is compacted into pellets or other structured bodies before being subjected to the three-phase pyrolitic treatment discussed above.

Figure 1:
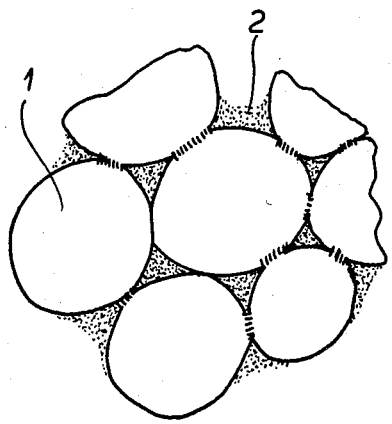
FIG. 1 is a mixture in which granules are bonded together by an inert organic mass according to the prior art.
Figure 2:
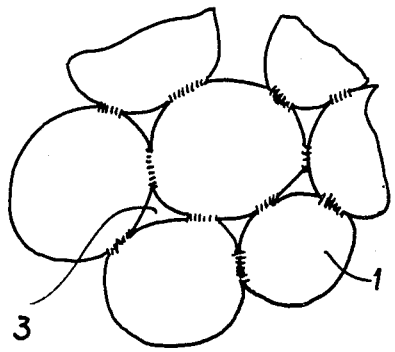
FIG. 2 is the mixture of FIG. 1 which has been subjected to thermal treatment under an oxidizing atmosphere.
Figure 3:
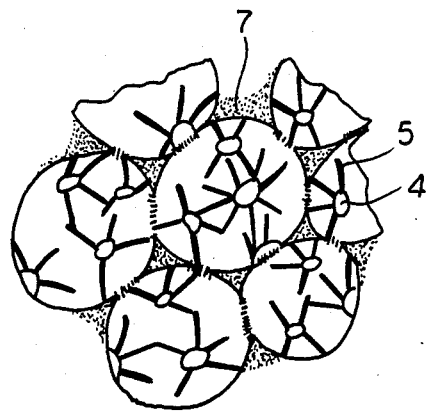
FIG. 3 is a mixture of granules bonded together with fatty acid in a heterogeneous structure after thermal treatment under a nonoxidizing atmosphere.
Figure 4:
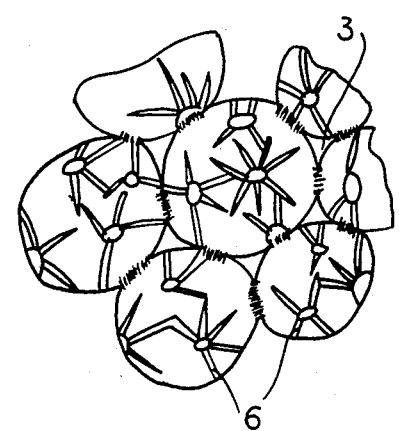
FIG. 4 is the mixture of FIG. 3 which has been further subjected to heating under an oxidizing atmosphere.
Figure 5:
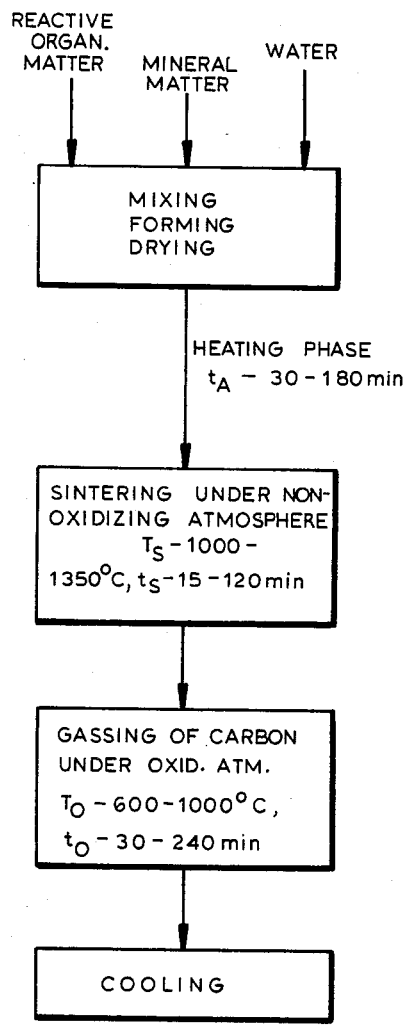
FIG. 5 is a flow diagram illustrating a first variant of the process for manufacturing highly porous mineralic bodies.
Figure 6:
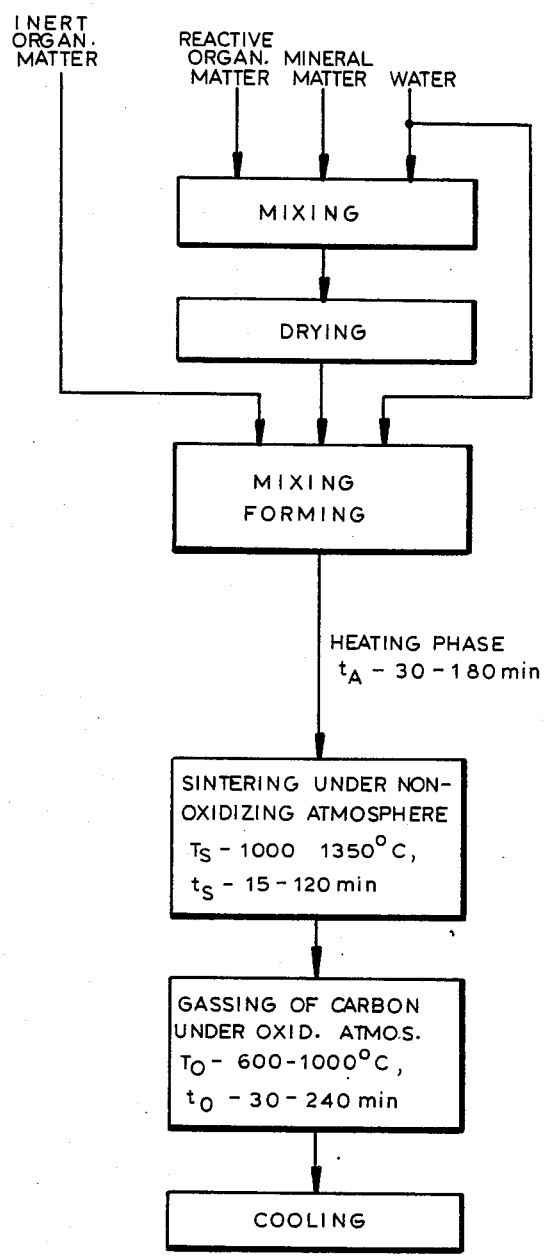
FIG. 6 is a flow diagram of a second variant of the process for manufacturing highly porous mineralic bodies.

In FIG. 1 there is a mixture of granules bonded together by an inert or nonreactive mixture. Porous bodies are produced in this mixture by slow heating to remove the nonreactive mixture 2 leaving mineralic matter 1. FIG. 2 depicts the resulting structure after the binding nonreactive mixture 2 has been removed by sintering leaving hollow spaces 3. These hollows are macroporous. FIG. 3 shows a mixture of porous mineral bodies with a reactive organic binder mixture of fatty acids 7 reacting with calcium oxides 4 in the mineral body 1 whereby a chain 5 is produced. After sintering the carbon is burnt out in an oxidizing atmosphere. In this way are formed the hollows 3 as shown in FIG. 4 in the form of micropores 6 and macroporous 3.

EXAMPLE I

Fly ash precipitated by electrostatic filtration in a lignite-burning power plant and flocculation sludge from a waste-water-purification plant are used as mineralic materials normally accompanied by minor quantities of organic matter. With the addition of water they are pressed into pellets and are dried for 3 hours at 150° C. The pellets are then subjected to a pyrolitic treatment whose parameters and results are specified separately, for ash and for sludge, in the following Table.

TABLE 1

| Parameters and results | | Ash | Sludge |
|---|---|---|---|
| Heating time | $t_A$ (min) | 60 | 90 |
| Sintering temperature | $T_s$ (°C.) | 1200 | 1050 |
| Sintering time | $t_s$ (min) | 30 | 120 |
| Oxidizing temperature | $T_o$ (°C.) | 800 | 600 |
| Oxidation time | $t_o$ (min) | 120 | 150 |
| Porosity | P (%) | 58 | 60 |
| Compressive strength | p (MPa) | 5 | 1 |
| Specific surface | sg (m$^2$/g) | 56 | 62 |

EXAMPLE II

Filter ash as described in the foregoing Example, after drying, is subjected to a variety of heat treatments as noted in the following Table. The several columns of that Table list the data of Table I as determined for the various pretreatments.

TABLE 2

| Pretreatment | $t_A$ | $T_s$ | $t_s$ | $T_o$ | $t_o$ | P | p | sg |
|---|---|---|---|---|---|---|---|---|
| Ball mill (60 minutes) | 60 | 1100 | 30 | 800 | 90 | 51 | 5 | 51 |
| Sifting (0.45-mm fraction) | 60 | 1100 | 30 | 800 | 90 | 55 | 5 | 63.3 |
| with HCl at pH 1.5 for 10 minutes | 60 | 1100 | 30 | 800 | 90 | 57 | 5 | 53.1 |

EXAMPLE III

Filter ash according to the foregoing Examples is enriched with various concentrations of calcium sulfate before being pressed into pellets. These concentrations and the corresponding data are given in the following Table.

TABLE 3

| Treatment with CaSO$_4$ in amount of: | $t_A$ | $T_s$ | $t_s$ | $T_o$ | $t_o$ | P | p | sg |
|---|---|---|---|---|---|---|---|---|
| 1% | 60 | 1150 | 45 | 800 | 90 | 51.2 | 1 | 35.1 |
| 5% | 60 | 1150 | 45 | 800 | 90 | 58 | 1 | 43.9 |
| 10% | 60 | 1150 | 45 | 800 | 90 | 60 | 1 | 52.1 |

EXAMPLE IV

The same type of filter ash is supplemented by various relatively inert carbon-containing materials, with possible addition of solvents or at elevated temperature, before being pressed and dried. These treatments and their results are

TABLE 4

| Treatment | $t_A$ | $T_s$ | $t_s$ | $T_o$ | $t_o$ | P | p | sg |
|---|---|---|---|---|---|---|---|---|
| Addition of 20 wt % of ash with 50% C content | 60 | 1150 | 120 | 800 | 120 | 57 | 1.5 | 60.3 |
| Addition of 10 wt % of bitumen/rubber mixture | 90 | 1000 | 90 | 800 | 60 | 54 | 2.0 | 67.3 |
| Addition of 25 wt % of wastewater sludge with 30% C content | 120 | 1050 | 60 | 800 | 60 | 57 | 1.5 | 58 |

EXAMPLE V

The described filter ash is supplemented by various reactive carbonaceous materials up to a carbon concentration of at most 10% by weight. The different admixtures and the data relating to the treatment of the resulting pellets are given in the following Table.

TABLE 5

| Treatment | $t_A$ | $T_s$ | $t_s$ | $T_o$ | $t_o$ | P | p | sg |
|---|---|---|---|---|---|---|---|---|
| Addition of 3 wt % of sodium stearate | 60 | 1100 | 30 | 800 | 15 | 52 | 1 | 30.3 |
| Addition of 6 wt % of sodium stearate | 60 | 1100 | 30 | 800 | 15 | 56 | 1 | 48.1 |
| Addition of 3 wt % of molasses | 60 | 1100 | 30 | 800 | 15 | 50.3 | 1 | 25.7 |
| Addition of 6 wt % of molasses | 60 | 1100 | 30 | 800 | 15 | 56.1 | 1 | 41.1 |
| Addition of 7.5 wt % of molasses | 60 | 1100 | 30 | 800 | 15 | 58.9 | 1 | 61.5 |

EXAMPLE VI

Filter ash, as in the preceding Examples, is first interacted with reactive carbonaceous materials, present in terms of their carbon content in an amount up to 5% by weight, in an aqueous medium and are then dried; the mixture is then supplemented, preferably at elevated temperature, by relatively inert organic substances in an amount up to 10% by weight in terms of their carbon content. The reactive and nonreactive substances and the data pertaining to the subsequent treatment of the pellets are summarized in the next Table.

TABLE 6

| Treatment/ amount in wt % | | $t_A$ | $T_s$ | $t_s$ | $T_o$ | $t_o$ | P | p | sg |
|---|---|---|---|---|---|---|---|---|---|
| Sodium stearate | 5 | 60 | 1100 | 30 | 800 | 120 | 58 | 1 | 56.1 |
| Bitumen (with 50% C) | 4 | | | | | | | | |
| Sodium stearate | 5 | 60 | 1100 | 30 | 800 | 120 | 61 | 1 | 85.5 |
| Bitumen (with 50% C) | 6 | | | | | | | | |
| Sodium stearate | 5 | 60 | 1100 | 30 | 800 | 120 | 63.7 | 1 | 108.7 |
| Bitumen (with 50% C) | 8 | | | | | | | | |
| Saccharose | 5 | 60 | 1100 | 30 | 800 | 120 | 54 | 1 | 45.2 |
| Bitumen (with 50% C) | 4 | | | | | | | | |
| Saccharose | 5 | 60 | 1100 | 30 | 800 | 120 | 57 | 1 | 69.3 |
| Bitumen (with 50% C) | 6 | | | | | | | | |
| Saccharose | 5 | 60 | 1100 | 30 | 800 | 120 | 61 | 1 | 95.1 |
| Bitumen (with 50% C) | 8 | | | | | | | | |

We claim:

1. A process for manufacturing highly porous mineralic bodies for use as adsorbents with heterogeneous pore structure which can be subjected to temperatures in excess of 1000° C. and can be regenerated many times, comprising the steps of:

(a) producing a mixture consisting predominantly of mineralic matter including fly ash and alkaline-earth compounds with reactive organic admixtures up to 15% in terms of the carbon content by weight of the mineralic matter;

(b) heating said mixture in a nonoxidizing atmosphere to a sintering temperature of said mineralic matter between 1000° C. and 1350° C. for 30 to 180 minutes;

(c) maintaining said mixture at said sintering temperature in said nonoxidizing atmosphere for a period of 15 to 120 minutes and long enough to enable consolidation of said mineralic matter into a coherent structure interpenetrated by carbonized organic matter; and (d) exposing said structure to an oxidizing atmosphere at a reduced temperature for 30 to 240 minutes of 600° C. to 1000° C. and high enough to burn off and gasify the carbonized matter with a resulting increase of the porosity of said structure so that the pore configuration thereof is heterogeneous.

2. A process as defined in claim 1 wherein said reduced temperature is about 800° C.

3. A process as defined in claim 2 wherein step (b) lasts for substantially 60 minutes, step (c) lasts for substantially 30 minutes and step (d) lasts for substantially 120 minutes.

4. A process as defined in claim 1 wherein an inorganic salt is added to said composite mixture prior to step (b).

5. A process as defined in claim 4 wherein said inorganic salt is selected from the group consisting of chlorides, sulfates and carbonates of alkaline earths.

6. A process as defined in claim 1 wherein said organic admixtures amount, in terms of their carbon content, to a maximum of about 15% by weight of said mineralic matter.

7. A process as defined in claim 6 wherein said organic admixtures include compounds inert with reference to said mineralic matter, present in terms of their carbon content in a maximum amount of about 10% by weight of said mineralic matter.

8. A process as defined in claim 6 wherein said organic admixtures include compounds reactive with said mineralic matter, present in terms of their carbon content in a maximum amount of about 5% by weight of said mineralic matter.

9. A process as defined in claim 8 wherein said reactive compounds are selected from the group consisting of sodium stearate, bitumen and saccharose.

10. A process as defined in claim 6 wherein said organic admixtures include a combination of compounds inert with reference to said mineralic matter, present in terms of their carbon content in a maximum amount of about 10% by weight of said mineralic matter, and compounds reactive with said mineralic matter, present in terms of their carbon content in a maximum amount of about 5% by weight of said mineralic matter.

11. A process as defined in claim 10 wherein said reactive compounds are first interacted with said mineralic matter whereupon, after drying of the products of interaction, said inert compounds are added.

12. A process as defined in claim 6 wherein said mineralic matter and said organic admixtures are compacted into pellets before being subjected to the treatment of step (b).

* * * * *